March 31, 1964        E. L. BARRETT        3,127,529
ELECTROMECHANICAL DRIVE AND MOTION CONVERSION DEVICE
Filed July 23, 1962        2 Sheets-Sheet 1
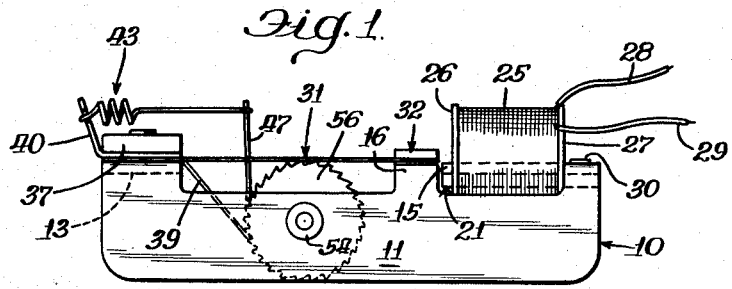
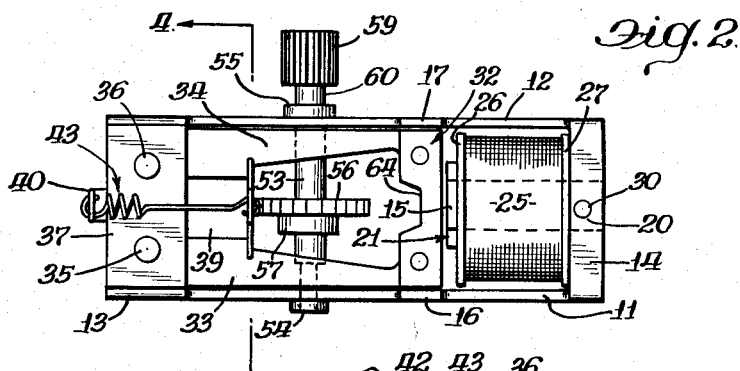
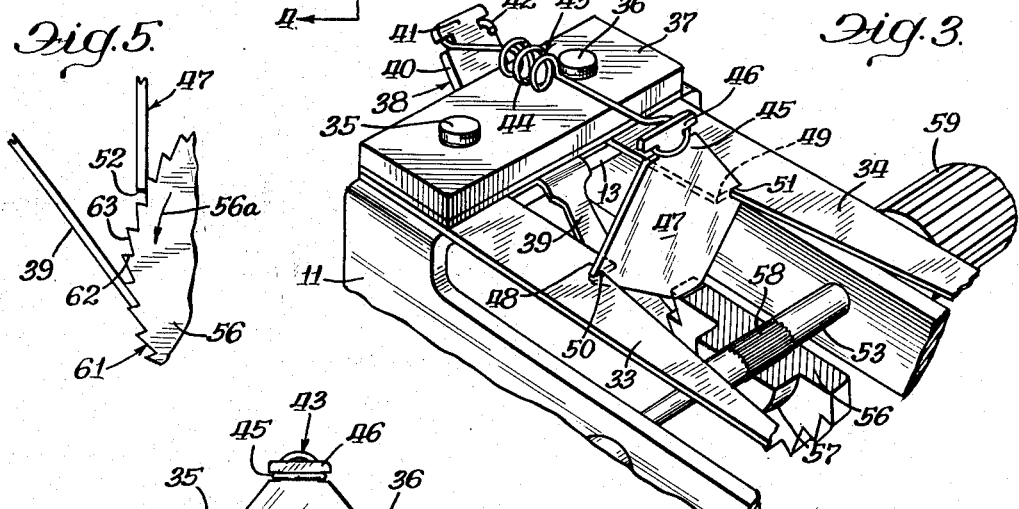
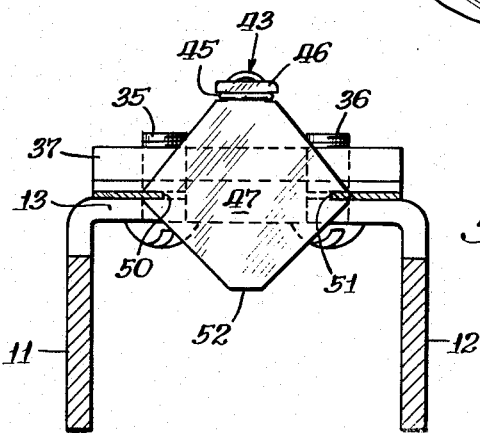
INVENTOR.
Edward L. Barrett
BY
Snow and Benno
Attys.

March 31, 1964  E. L. BARRETT  3,127,529
ELECTROMECHANICAL DRIVE AND MOTION CONVERSION DEVICE
Filed July 23, 1962  2 Sheets-Sheet 2
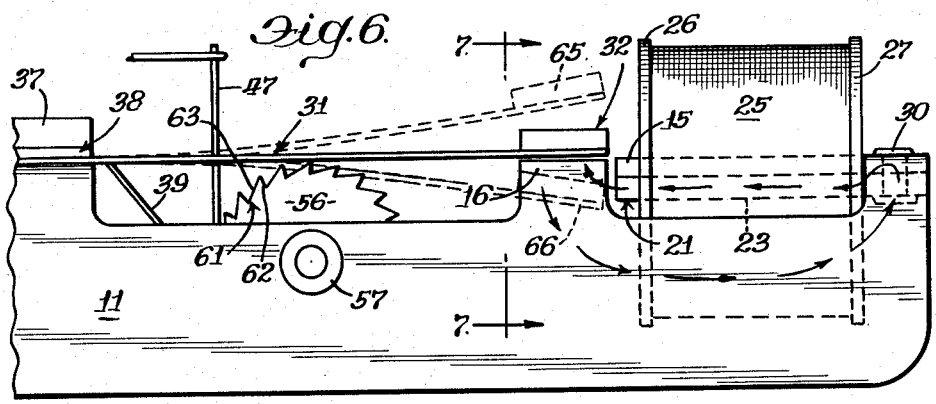
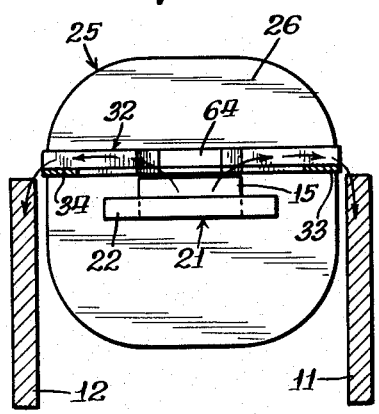
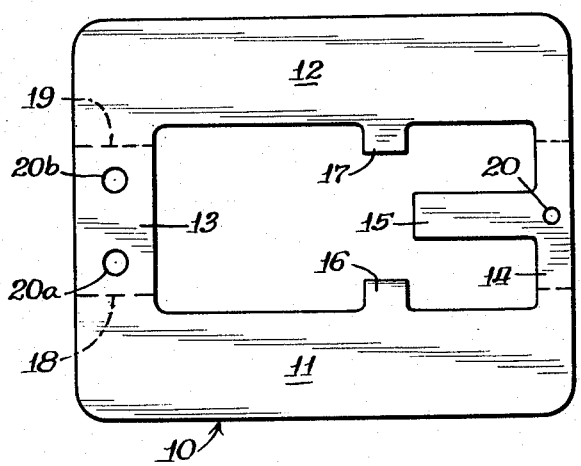
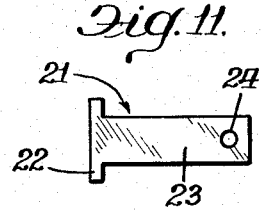
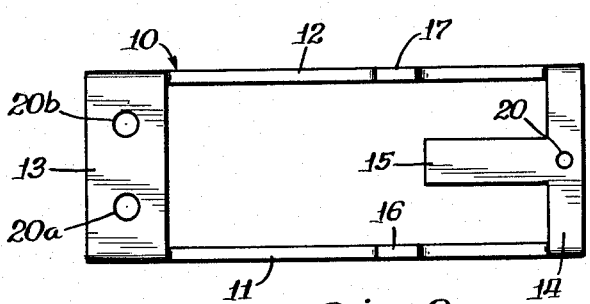
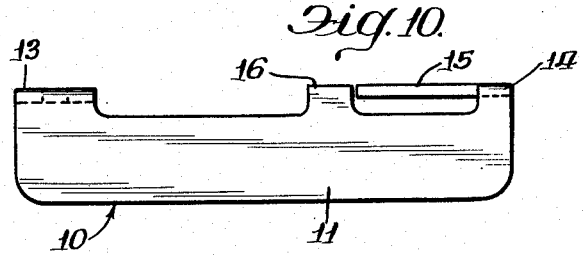
INVENTOR.
Edward L. Barrett
BY Snow and Benno
Attys _United States Patent Office_  3,127,529
Patented Mar. 31, 1964

3,127,529
ELECTROMECHANICAL DRIVE AND MOTION CONVERSION DEVICE
Edward L. Barrett, 506 Malden, La Grange Park, Ill., assignor of eleven percent to Louis K. Pohl, Elmwood, eleven percent to H. P. Reynolds, Wilmette, and eleven percent to Frank A. Furar, Riverside, Ill., and eleven percent to William G. Pohl, White Bear Lake, Minn.
Filed July 23, 1962, Ser. No. 211,584
25 Claims. (Cl. 310—21)

This invention relates generally to electromechanical devices and more particularly to a novel device which is operated by an alternating-current to produce a rotary mechanical motion of a shaft.

The primary object of the present invention is to provide a novel electromechanical device which may be operated from a source of alternating-current such as is commonly residentially supplied and which will produce rotary mechanical motion in a shaft.

It is still another object to provide in an electromechanical device a novel reed arrangement which will vibrate responsive to a magnetic flux field produced from a source of 60 cycle alternating-current to act upon a ratchet wheel to convert the vibrations of the reed into a rotary motion of the ratchet wheel.

It is still another object to provide a novel pivotally carried ratchet construction for rapid step-by-step rotation of a ratchet wheel with the pivot means for the ratchet providing a minimum of friction in the operation of the ratchet.

It is still another object to provide a novel arrangement of a vibrating reed and ratchet for rotating a ratchet wheel responsive to vibrations of the reed.

It is still another object to provide a novel electromechanical device which is particularly adapted for use as a simple electric timing motor.

An important feature of the invention is the almost frictionless assembly of a ratchet and vibrating reed.

Other objects and features of the invention will be apparent upon a perusal of the following specification and drawings in which:

FIGURE 1 is a side elevational view of an electromechanical device constructed according to the invention;

FIGURE 2 is a top plan view of the structure shown in FIGURE 1;

FIGURE 3 is an enlarged partial isometric view of a portion of the constructions of FIGURES 1 and 2;

FIGURE 4 is an enlarged cross sectional view of the structure shown in FIGURE 2 and taken substantially along the line 4—4 of FIGURE 2;

FIGURE 5 is an enlarged partial side elevational view of a portion of the ratchet, pawl and ratchet wheel of the construction shown in FIGURES 1 and 2;

FIGURE 6 is a partial enlarged side elevational view of the structure shown in FIGURE 1; and FIGURE 7 is a view of the structure shown in FIGURE 6 taken substantially along the line 7—7 of FIGURE 6;

FIGURE 8 is a top plan view of the frame used in the motor of this invention prior to bending;

FIGURE 9 is a top plan view of the motor frame subsequent to bending;

FIGURE 10 is a side elevational view of the frame as shown in FIGURE 9;

FIGURE 11 is a top plan view of the coil locking member.

The present embodiment is the preferred embodiment, but it is to be understood that changes can be made in the present embodiment by one skilled in the art without departing from the spirit and scope of the present invention.

Generally, the embodiment of the invention shown in the drawings comprises an electromechanical device which is particularly useful as a simple and efficient timing motor for controlling the operation of machines such for example as automatic electric washing machines. The device is operated from a source of conventional residential power such as 110 volt, 60 cycle alternating-current. The device operates to convert the power delivered thereto into the rotation of a shaft at a speed of one revolution per second. The device comprises an elongated frame which is U-shaped in cross section and is formed of a material having high magnetic permeability, such a metal commonly known as Swedish steel. At one end of the frame a coil of wire is carried on an iron core with the core disposed longitudinally of the frame and substantially at the transverse center and at one end thereof. One end of the core is connected to a cross member of the frame which is integrally formed with the side walls thereof so that that end of the core, the cross member and the sidewalls of the frame are connected in a magnetic circuit. The other end of the core is positioned between two upstanding portions of the side walls of the frame. The device further comprises a reed which carries an armature transversely of the frame between the two upstanding portions of the side walls of the frame and in proximity to the end of the core positioned between the upstanding portions. The armature thereby completes magnetic circuits between the core and the upstanding portions of the side walls of the frame. A complete magnetic circuit is thereby provided between each end of the core of the coil and the side walls of the frame. The armature is formed of a material such as steel so that it will retain residual magnetism therein.

The reed which carries the armature at one end thereof is formed of two members which extend from each end of the armature longitudinally of the frame to the other end thereof. The two arms of the reed are anchored to the frame so that the armature may oscillate upwardly and downwardly between the upwardly extending portions of the side walls of the frame. Intermediate the ends of the arms of the reed assembly, a somewhat diamond-shaped ratchet is carried. The ratchet is carried on the arms of the reed in a unique manner which permits pivotal movement of the ratchet relative to the arms of the reed with a minimum of friction between the ratchet and the reed. This pivotal mounting arrangement of the ratchet is accomplished by a pair of notches formed one in each side of the ratchet. The notches are slightly greater in depth than the thickness of the arms of the reed. The ratchet is positioned with each notch engaging the inner marginal edge of one of the arms of the reed. The upper end of the ratchet is connected to one end of a coiled spring, the other end of which is connected to an anchor which extends above the upper surface of the frame. The coiled spring biases the lower end of the ratchet against the teeth of a ratchet wheel and in the reaction of the ratchet against the ratchet wheel, the ratchet is also biased against a pair of shoulders on the inner edge of the arms of the reed. The ratchet wheel is journally carried between the side walls of the frame for rotation about an axis disposed transversely of the frame. One end of the shaft of the ratchet wheel is provided with a small spur gear which is the output member of the device. The device further includes a pawl which is formed of a material such as spring steel. One end of the pawl is carried on the frame and the other end thereof engages the teeth of the ratchet below the engagement of the ratchet with the ratchet wheel.

When the device is at rest, the ratchet will engage one of the teeth of the ratchet wheel at a circumferential midpoint thereof. Since the armature is formed of a material having some residual magnetism, the first half-cycle of current applied to the coil will establish a magnetic flux circuit between the core and the side walls of the frame which will either move the armature upwardly or downwardly dependent upon the polarity of that first half-cycle. The armature in moving upwardly or downwardly will move the reed which in turn will move the ratchet either upwardly or downwardly one-half of the circumfential length of a ratchet tooth. The next half-cycle of the current applied to the coil, in being of the opposite polarity will move the armature back through the at-rest position and beyond by an amount which will cause the ratchet to move the circumferential length of one tooth of the ratchet wheel. The next half-cycle of current in the coil will move the armature in the opposite direction to move the ratchet in the reverse direction an amount represented by the circumferential length of one tooth of the ratchet wheel. Thus it may be seen that for every full cycle of current delivered to the coil, the ratchet is moved upwardly and downwardly in one complete cycle. The ratchet wheel in the present embodiment is provided with 60 teeth. For 60 cycle current this arrangement will provide for a rotational speed of the shaft of the ratchet wheel of one revolution per second. In the oscillation of the armature between and above the upstanding portions of the side walls of the frame, it may be seen that the arms of the reed will be flexed upwardly and downwardly. Since the ratchet is biased at its lower end against the teeth of the ratchet wheel the upward and downward flexing of the arms of the reed will result in a relative rocking movement between the ratchet and the arms of the reed as the lower end of the ratchet moves between the root and peak of each ratchet tooth. This rocking movement of the ratchet relative to the arms of the reed is accomplished with a minimum of friction due to the notched arrangement of the ratchet in cooperation with the arms of the reed. Because of the notches in the ratchet, the ratchet will rock on the edges of the notches with substantially no friction between the edges of the notches and the arms of the reed. The pawl in engaging the ratchet wheel prevents the ratchet wheel from having reverse rotation as the ratchet is moved to a succeeding tooth of the ratchet wheel.

As shown in the drawings and more particularly in FIGURE 8 a frame 10 is made of a generally flat rectangular shaped piece of steel. The flat rectangular frame member is formed with spaced apart lateral side portions 11 and 12 which are joined at their ends by transverse end portions 13 and 14. A strip-like member 15 extends inwardly of the generally rectangular frame 10 from the end 14 thereof. The strip-like projection 15 is disposed substantially centrally of, and is formed integrally with, the end 14. The frame further includes opposed inwardly extending projections 16 and 17 from each side 11 and 12 thereof. Longitudinally extending bend lines 18 and 19 are disposed parallel to one another and are indicated by dashed lines on the flat frame member as shown in FIGURE 8. FIGURES 9 and 10 show the motor frame after being bent along the longitudinal lines 18 and 19. Following bending, the elongated frame has an inverted U-shape in cross section. The side members 11 and 12 are now vertical walls disposed parallel to one another and the projections 16 and 17 previously extending inwardly toward each other now project upwardly as continuing projections from the upper edges of the vertical walls 11 and 12.

The end portion 14 has a hole 20 therethrough at a position outwardly of the inwardly extending strip-like projection 15. FIGURE 11 shows a T-shaped steel member 21 which will later be described as forming a part of the coil core along with the frame projection 15. The T member 21 includes a cross head 22 and a longitudinally extending shank 23. A hole 24 is provided in the outer end of the shank 23 and will later be described as the means through which the T member 21 is fastened to the frame 10.

The electromechanical or vibrating motor of this invention includes a coil of wire 25 which is carried between spaced fiber board insulator ends 26 and 27. Wire leads 28 and 29 are shown leading to the coil 25. The coil 25 has a central passage so that it may be slidably mounted onto and over the inwardly extending projection 15 of the frame 10. The locking of the coil in position on the strip-like member 15 is accomplished by inserting the shank 23 of the T-shaped member 21 through the inner end of the coil immediately beneath the strip member 15 to a position where the cross head 22 abuts the outer surface of the insulator member 26 and the hole 24 is in alignment with the hole 20 in the end member 14 of the frame 10. A rivet or the like 30 is passed through the aligned holes 20 and 24 to hold the members 15 and 23 fixedly together to constitute a longitudinally disposed core for the coil 25. Assembly of the coil onto the frame in this manner prevents its removal by reason of the enlarged cross head 22 of the T-shaped locking member 21. Further the T-member 21 provides additional steel for the core which is now a laminate of the member 15 and the member 21.

The vibrator motor of this invention includes a reed construction 31. The reed comprises a transversely disposed armature 32 which is located between the upstanding projections 16 and 17 of the frame 10. The reed 31 also includes spaced apart spring arms 33 and 34 which are fixedly attached to the lateral side edges of the armature 32. Screws 35 and 36 pass upwardly through the holes 20a and 20b in the frame end 14 and through the spaced apart reed arms 33 and 34 respectively. A cap bar 37 spanning the spaced reed arms 33 and 34 is positioned directly above the frame end 14 and threadedly receives the ends of the screws 35 and 36 to thus fixedly hold the reed arms to the frame 10. Although the outer ends of the reed arms are affixed to the frame 10 it should be understood that the inner armature carrying end of the reed 31 has oscillation or swinging movement between the side arms 11 and 12 of the frame and more particularly at a location adjacent the upstanding projections 16 and 17.

A spring steel strip member 38 is disposed between the spaced reed arms 33 and 34 and is clamped between the frame end 14 and the cap bar 37. An inner end 39 of the strip 38 is bent angularly downwardly and as will later be described constitutes a pawl for a ratchet device. The outer end 40 of the strip member 38 is bent angularly upwardly and constitutes a spring anchor. The top of the anchor 40 is provided with a T head 41 to receive one end 42 of a spring 43. The coils 44 of the spring 43 are located directly over the cap bar 37. The other end 45 of the spring 43 is attached to a T head 46 of a diamond-shaped ratchet 47.

The spaced apart reed arms 33 and 34 are provided with offsets or shoulders 48 and 49 facing inwardly in opposing relationship and at a location on the arms intermediate the anchoring end and the armature carrying end. The diamond-shaped ratchet 47 is provided with inwardly opening notches or slots 50 and 51 on opposite sides thereof for the purpose of loosely engaging the top and bottom sides of the reed arms 33 and 34. This engagement of the ratchet 47 with the reed arms is at a location just inwardly of the shoulders 48 and 49 so that the diamond-shaped ratchet abuts the shoulders and is thereby prevented from further rearward movement at the substantial center or wide portion of the diamond. The lower edge 52 of the ratchet 47 is best shown in FIGURE 4. It is this edge that cooperates with the teeth of a ratchet wheel to be subsequently described.

The motor of this invention further includes a cross shaft 53 which is journaled in bearings 54 and 55 in the spaced apart side walls 11 and 12 of the frame 10. The bearings 54 and 55 are in axial alignment with each other. A ratchet wheel 56 is affixed to substantially the center of the shaft 53 at a position located between the side walls 11 and 12 of the frame 10. The ratchet wheel 56 is formed with a laterally extending hub 57. The shaft 53 is knurled at 58 for an extent substantially equal to the combined width of the ratchet wheel 56 and the hub 57. The ratchet wheel is pressed onto the shaft 53 and forced over the knurled portion 58 to thereupon hold the ratchet fixed relative to the shaft 53 and upon imparting rotation to the ratchet wheel 56 the shaft 53 is also rotated.

A spur gear 59 is mounted on an outer end 60 of the shaft 53 which projects beyond the side of the frame 10. The spur gear is preferably retained on the shaft by means of knurling (not shown) in the same manner as shown for the attachment of the ratchet wheel 56 to the shaft 53. The ratchet wheel 56 is provided with teeth 61 around the entire circumference thereof. Each ratchet tooth is formed with two walls meeting at an apex. The first wall 62 is generally formed as a radius from the center of the ratchet wheel 56 and may appropriately be termed a right angle wall of the tooth 61. The other wall 63 is an angled wall having an angle of something substantially less than 90°. The teeth enable the ratchet wheel to be rotated by an up and down movement of the ratchet member 47. There are preferably sixty teeth on the ratchet wheel for a 60 cycle electrical power source to thereby produce one revolution of the shaft 53 per second. However, it should be understood that with a power supply of another number of cycles, such as 50 cycles, then it would be necessary to have the ratchet wheel contain 50 teeth if it is still desired to accomplish a one revolution per second for the output shaft 53. It should of course be understood that the vibrator motor of this invention can and will operate to drive the ratchet wheel 56 regardless of the number of cycles of input and there will be a particular timed relationship of the output to the input dependent upon the cycles of alternating-current input and the number of teeth in the ratchet wheel. However, if it is desired to obtain one revolution per second of the output shaft 53, then it is essential to employ the same number of teeth in the ratchet wheel as the number of cycles of alternating-current used to engage the coil 25.

As best shown in FIGURE 5 the pawl 39 engages the right angled wall 62 of the tooth 61 and prevents reverse or clockwise rotation of the ratchet wheel 56. Rotation of the ratchet wheel 56 may thus only be accomplished in the direction of the arrow 56a. The diamond-shaped ratchet 47 has its lower edge 52 spring urged against the teeth 61 by action of the spring 43. The extension spring 43 also causes the central pivoting portion of the ratchet 47 to be spring biased against the shoulders on the reed arms. It is apparent that the one spring performs the dual function of urging the ratchet into engagement with the ratchet wheel and against the reed shoulders. The ratchet is thus confined in a generally fixed longitudinal position relative to the elongated reed. The vibration of the reed 31 causes an up and down movement of the ratchet to effect a driving of the ratchet wheel 56. The spring 43 is used to maintain constant urging of the ratchet 47 into ratchet teeth engagement. The design of the spring 43 is such that a minimum of weight of the spring is imposed on the action of the reed 31. For that reason the coils 44 of the spring which constitute the heaviest portion thereof are located back over the stationary cap bar 37 of the vibrator motor of this invention. The at-rest position of the lower edge 52 of the ratchet 47 is substantially midway between adjacent teeth. As shown in FIGURE 5 the at-rest position is approximately halfway up the angled wall 63. When the reed is vibrated by operation of the coil and cooperating core and armature the ratchet 47 either commences movement upwardly or downwardly depending upon the polarity of the alternating-current cycle which happens to initially energize the coil and the polarity of the armature. Thus the first half tooth of movement of the ratchet 47 is substantially lost motion, but at the point where the ratchet 47 abuts a radial or right angled wall 62 of the tooth, either up or down from the starting position of the ratchet as shown in FIGURE 5, successive opposite movement of the ratchet causes rotation of the ratchet wheel 56 and thus also rotation of the shaft 53 and the output spur gear 59. The pawl 39 is arranged so that it might freely ride up and over the inclined tooth wall 63 as the ratchet wheel 56 moves in the direction of the arrow 56a. However, as previously stated, the pawl 39 prevents reverse movement of the ratchet wheel 56 by reason of its engagement with the right angle wall 62 of the tooth 61.

The notch 64 in the central portion of the armature 32 disposed on the side thereof opposite or away from the coil 25 is for the purpose of permitting use of a greater diameter ratchet wheel 56 without affecting the flow of magnetic flux through the armature. For convenience the upwardly swung postion of the reed 31 has been shown in dash lines at 65 in FIGURE 6 and the downwardly swung position 66 has similarly been shown in dash lines in FIGURE 6.

In the operation of the vibrator motor of this invention alternating-current of an electrical power supply is delivered to the coil 25 through the leads 28 and 29. The first half-cycle of current establishes a magnetic flux circuit between the laminated core 15—21 and the side walls 11 and 12 of the frame 10. The upstanding projections 16 and 17 on the side walls act to better complete the magnetic flux circuits. This causes movement of the armature 32, either upwardly or downwardly dependent upon the polarity of that first half-cycle. The armature 32, in moving upwardly or downwardly, causes the reed 31 through the diamond-shaped ratchet member 47 to move upwardly or downwardly one-half of the length of angled tooth wall 63. The next half-cycle of the alternating-current applied to the coil 25 will be of opposite polarity causing the armature 32 to move back to the at-rest position which is directly opposite the end of the core 15 and thence upwardly or downwardly beyond that position by an amount which causes the ratchet 47 to move a distance equal to the circumferential length of one tooth 61 of the ratchet wheel 56. The next half-cycle of current applied to the coil 25 causes the armature to move in an opposite direction to thereupon move the ratchet 47 in a reverse direction an amount represented by the circumferential length of one tooth of the ratchet wheel 56. Every full cyle of current delivered to the coil 25 effects an upward and downward movement of the ratchet member 47 to produce a downward rotational movement of the ratchet wheel 56, a distance equal to the circumferential length of one tooth of the ratchet wheel. Rotational movement of the ratchet wheel occurs only in the direction of the arrow 56a. The elastic reed 31 develops a periodic motion of alternate movement in opposite directions from the position of equilibrium or at-rest when the armature is disposed directly opposite the coil core. The frequency of the vibrations is determined by the frequency of the electrical alternating-current delivered to the coil 25. Similarly the alternating changes in polarity of the magnetic flux occasioned by the delivery of alternating-current to the coil 25 causes the armature to alternately swing upwardly and downwardly. Thus, if a 60-cycle alternating-current is used, there will be sixty complete vibrations of the reed, sixty complete oscillations of the ratchet 47 and one complete rotation of a sixty tooth ratchet wheel in each second . The output of the spur gear 59 of the vibrator motor of this invention is thus one revolution per second. It is the particular hinge mounting of the ratchet 47 on the reed 31 that enables almost frictionless drive of the ratchet wheel. The ratchet 47 rocks about its opposed inwardly opening slots 50 and 51 on the reed arms 33 and 34 and with the aid of the offset shoulders 48 and 49 on the reed arms the ratchet 47 is completely entrapped and yet performs the function of driving the ratchet wheel 56.

I am aware that numerous details of construction may be varied throughout a wide range without departing from the principles disclosed herein and I therefore do not propose limiting the patent granted hereon otherwise than as necessitated by the appended claims. I particularly comprehend that frame arrangements other than an integral frame may be used to carry and position the various parts in proper cooperation.

What is claimed is:

1. A vibrator motor comprising a frame, a reed having one end affixed to said frame, a steel armature at the other end of said reed, a coil carried on said frame adjacent said steel armature, a core for said coil extending in a direction substantially lengthwise of said reed and having one end thereof in close relationship with said armature, a ratchet wheel journally mounted on said frame, a ratchet, means pivotally mounting said ratchet on said reed, spring means having one end fastened to said frame and the other end fastened to said ratchet on one side of said pivotal mounting, the other side of said ratchet opposite said pivotal mounteing adapted to engage and be spring biased against said ratchet wheel, whereby when alternating current is delivered to said coil the reed and its armature are caused to vibrate with the ratchet acting to drive said ratchet wheel, said means pivotally mounting said ratchet on said reed including said ratchet having an inwardly opening notch and said reed having a shoulder thereon.

2. A vibrator motor comprising a U-shaped rectangular frame, a reed including spaced reed arms, said reed arms each having one end affixed to said frame, a steel armature spanning the other ends of said reed arms, said frame having a strip-like member extending inwardly of the rectangle from one end thereof, a coil carried on said strip-like member and located adjacent said steel armature, said strip-like member constituting a core for said coil extending in a direction substantially lengthwise of said reed and having its inner end thereof in close relationship with said steel armature, a ratchet wheel, a supporting shaft for said ratchet wheel, means journally mounting said shaft in a transverse position on said frame, a ratchet, means pivotally mounting said ratchet on and between said spaced reed arms, spring means having one end fastened to said frame and the other end fastened to said ratchet on one side of said pivotal mounting, the other side of said ratchet opposite said pivotal mounting adapted to engage and be spring biased against said ratchet wheel, whereby when alternating current is delivered to said coil the reed and its armature are caused to vibrate with the ratchet acting to drive said ratchet wheel.

3. A device as set forth in claim 2 in which said means pivotally mounting said ratchet comprises said ratchet having oppositely disposed inwardly opening notches from both sides thereof, and said reed arms having opposing shoulders whereby when the ratchet has its notches engaging the upper and lower surfaces of the reed arms the shoulders thereon act to hold said ratchet against longitudinal movement along the reed arms.

4. A vibrator motor comprising a U-shaped rectangular frame, a reed including spaced reed arms, said reed arms each having one end affixed to said frame, a steel armature spanning the other ends of said reed arms, said frame having a strip-like member extending inwardly of the rectangle from one end thereof, a coil carried on said strip-like member and located adjacent said steel armature, said strip-like member constituting a core for said coil extending in a direction substantially lengthwise of said reed and having its inner end thereof in close relationship with said steel armature, a ratchet wheel disposed in a longitudinal plane between said spaced reed arms, a supporting shaft for said ratchet wheel, means journally mounting said supporting shaft in a transverse position in said frame, a ratchet, means pivotally mounting said ratchet on and between said spaced reed arms, spring means having one end fastened to said frame and the other end fastened to said ratchet on one side of said pivotal mounting, the other side of said ratchet opposite said pivotal mounting adapted to engage and be spring biased against said ratchet wheel, whereby when alternating current is delivered to said coil the reed and its armature are caused to vibrate with the ratchet acting to drive said ratchet wheel.

5. A vibrator motor comprising an elongated rectangularly shaped open frame, said frame having generally vertically disposed side walls and horizontally disposed end portions adjoining the top ends of said side walls, laterally spaced reed arms each having a similar end affixed to one end portion of said frame, a steel armature adjoining the other ends of said reed arms, a coil carried on said frame adjacent said steel armature, a core for said coil extending in a direction substantially lengthwise of said reed and having one end thereof in close relationship with said steel armature, a ratchet wheel journally mounted on said frame for rotation in a plane lying longitudinally between said spaced reed arms, a ratchet, means pivotally mounting said ratchet on said spaced reed arms, spring means having one end fastened to said frame and the other end fastened to said ratchet on one side of said pivotal mounting, the other side of said ratchet opposite said pivotal mounting adapted to engage and be spring biased against said ratchet wheel, whereby when alternating current is delivered to said coil the reed and its armature are caused to vibrate with the ratchet acting to drive said ratchet wheel.

6. A device as set forth in claim 5 in which said core constitutes an integral part of said end portion of said frame opposite the attachment of said reed arms, and said core projecting longitudinally inwardly of said rectangularly shaped open frame.

7. A device as set forth in claim 5 in which said core comprises a first part integral with said other end portion of said frame and a second part lying closely adjacent to said first part, said core parts projecting longitudinally inwardly of said rectangularly shaped open frame, and means on said second part arranged and constructed to lock said coil on said frame.

8. A device as set forth in claim 7 in which said second part includes a shank and a T cross head, said shank being approximately the same width as said first part, said T cross head adapted to engage and hold said coil on said core, and means fastening the shank of the second part to said first part.

9. A vibrator motor comprising an elongated rectangularly shaped open frame, said frame having generally vertically disposed side walls and horizontally disposed end portions adjoining the top ends of said side walls, laterally spaced reed arms each having a similar end affixed to one end portion of said frame, a steel armature adjoining the other ends of said reed arms, a core formed integrally with said frame and extending in a direction substantially lengthwise of said reed arms and having one end thereof in close relationship with said steel armature, a coil carried on said core adjacent said steel armature, a ratchet wheel journally carried on said frame in a longitudinal direction between said spaced reed arms, a ratchet, means pivotally mounting said ratchet on said spaced reed arms, spring means having one end fastened to said frame and the other end fastened to said ratchet on one side of said pivotal mounting, the other side of said ratchet opposite said pivotal mounting adapted to engage and be spring biased against said ratchet wheel, a pawl carried on said frame and arranged to engage said ratchet wheel at a location spaced from said ratchet, whereby when alternating current is delivered to said coil the reed arms and their armature are caused to oscillate about their ends affixed to said frame thereby causing said ratchet to drive said ratchet wheel.

10. A device as set forth in claim 9 in which said frame includes a strip member disposed longitudinally over the end thereof opposite the end having the core formed integrally therewith, said strip member having an angularly upwardly and outwardly extending portion adapted to receive and support said spring means, and said strip member having an angularly downwardly and inwardly extending portion constituting said pawl.

11. A device as set forth in claim 10 in which said spring means includes an extension spring with coils disposed only over the frame end having the spring carrying strip member.

12. A vibrator motor comprising a generally elongated rectangular frame, spaced apart generally parallel reed arms, said reed arms each having one end affixed to said frame, a steel armature spanning the other ends of said reed arms, said frame having an integral strip-like member extending inwardly from one end of the rectangle, a coil carried on said strip-like member and located adjacent said steel armature, said strip-like member constituting a core for said coil extending in a direction substantially lengthwise of said spaced apart reed arms and having its inner end thereof in close relationship with said steel armature, a ratchet wheel journally mounted on said frame at a position between said spaced reed arms, a diamond-shaped ratchet, means pivotally mounting the wide central portion of said diamond-shaped ratchet on said spaced apart reed arms, spring means having one end fastened to said frame and the other end fastened to the top apex of said diamond-shaped ratchet, the bottom apex of said diamond-shaped ratchet adapted to engage and be spring-biased against said ratchet wheel, whereby when alternating current is delivered to said coil the reed and its armature are caused to vibrate with the ratchet acting to drive said ratchet wheel.

13. A device as set forth in claim 12 in which said means pivotally mounting the diamond-shaped ratchet includes said diamond-shaped ratchet slotted inwardly from opposite sides, and said slots being of a height slightly greater than the thickness of said reed arms.

14. A device as set forth in claim 13 in which said means pivotally mounting the diamond-shaped ratchet further includes inwardly projecting shoulders on said spaced apart reed arms.

15. A vibrator motor comprising an elongated rectangularly shaped open frame, said frame having generally vertically disposed side walls and horizontally disposed end portions adjoining the top ends of said side walls, laterally spaced reed arms each having a similar end affixed to one end portion of said frame, a steel armature adjoining the other ends of said reed arms, said side walls having upwardly extending projections flanking the ends of said steel armature, a coil carried on said frame adjacent said steel armature, a core for said coil extending in a direction substantially lengthwise of said reed and having one end thereof in close relationship with said steel armature, a ratchet wheel journally mounted on said frame between said vertically disposed side walls, a ratchet, means pivotally mounting said ratchet on said spaced reed arms, spring means having one end fastened to said frame and the other end fastened to said ratchet on one side of said pivotal mounting, the other side of said ratchet opposite said pivotal mounting adapted to engage and be spring biased against said ratchet wheel, whereby when alternating current is delivered to said coil the reed and its armature are caused to vibrate with the ratchet acting to drive said ratchet wheel.

16. A vibrator motor comprising an elongated rectangularly shaped open frame, said frame having generally vertically disposed side walls and horizontally disposed end portions adjoining the top ends of said side walls, laterally spaced reed arms each having a similar end affixed to one end portion of said frame, a steel armature adjoining the other ends of said reed arms, a core formed integrally with one of said horizontally disposed end portions of said frame and extending in a direction substantially lengthwise of said reed and having one end thereof in close relationship with said steel armature, a coil carried on said core adjacent said steel armature, an output shaft journaled transversely in said frame between said vertically disposed side walls, a ratchet wheel affixed to said output shaft at a location between said laterally spaced reed arms, a ratchect, means pivotally mounting said ratchet on said spaced reed arms, spring means having one end fastened to said frame and the other end fastened to said ratchet on one side of said pivotal mounting, the other side of said ratchet opposite said pivotal mounting adapted to engage and be spring biased against said ratchet wheel, whereby when alternating current is delivered to said coil the reed and its armature are caused to vibrate with the ratchet acting to drive said ratchet wheel.

17. A device as set forth in claim 16 in which there is included a spur gear affixed to said output shaft at a location outside of said vertically disposed side walls.

18. An electromechanical device of the type in which a spring reed is vibrated electrically and the vibrating reed is utilized as a mechanical drive, comprising a support, a reed, said reed having one end thereof affixed to said support, said reed having spaced apart arms, a ratchet wheel journally carried on said support, said spaced apart reed arms flanking said ratchet wheel, a ratchet, means rockably mounting said ratchet on said spaced apart reed arms, and said ratchet arranged and constructed to engage and drive said ratchet wheel.

19. A device as set forth in claim 18 in which said means rockably mounting said ratchet includes said ratchet having oppositely disposed inwardly opening notches from both sides thereof to relatively loosely engage the upper and lower surfaces of the spaced apart reed arms, and means on said reed arms for retaining said ratchet in generally fixed longitudinal position thereon.

20. A device as set forth in claim 19 in which said means on said reed arms comprises generally transversely aligned inwardly projecting shoulders located adjacent the engagement of said ratchet.

21. A device as set forth in claim 18 in which said means rockably mounting said ratchet includes spring means located between said support and said ratchet to normally urge one end of said ratchet into engagement with said ratchet wheel, said ratchet being a width sufficient to span the space between said spaced apart reed arms, said ratchet slotted inwardly from opposite sides thereof, said slots being of a height slightly greater than the thickness of said reed arms whereby the inner sides of said spaced apart red arms engage said oppositely disposed slots, and means on said reed arms for retaining said ratchet in generally fixed longitudinal position thereon.

22. In an electromechanical device, a reed fixedly carried at one end thereof, means for electrically vibrating the other end of said reed, said reed comprising a pair of spaced apart arms, a ratchet wheel carried in cooperation with said reed with said spaced apart reed arms flanking said ratchet wheel, a ratchet, means rockably mounting said ratchet on said spaced apart reed arms with one end of said ratchet positioned to drivingly engage said ratchet wheel.

23. A device as set forth in claim 22 in which said means rockably mounting said ratchet comprises the forming of said ratchet with oppositely disposed inwardly opening notches one on each side thereof with said notches relatively loosely engaging the upper and lower surfaces of the inner marginal edges of said spaced apart reed arms, and means on said reed arms for positioning said ratchet parallel to the axis of rotation of said ratchet wheel.

24. A device as set forth in claim 23 in which said last mentioned means on said reed arms comprises a pair of shoulders formed on said inner marginal edges of said reed arms with said shoulders positioned parallel to the axis of rotation of said ratchet wheel.

25. A device as set forth in claim 24, and means connected to the end of said ratchet opposite from the end drivingly engaging said ratchet wheel for biasing said ratchet into engagement with said ratchet wheel and for biasing said ratchet against said pair of shoulders in the reaction of said ratchet against said ratchet wheel.

References Cited in the file of this patent

UNITED STATES PATENTS

| | | |
|---|---|---|
| 345,720 | Parcelle | July 20, 1886 |
| 658,997 | Perret | Oct. 2, 1900 |
| 1,653,888 | Chaplin | Dec. 27, 1927 |